June 8, 1937.  W. B. FAGEOL  2,083,059
MOTOR VEHICLE AND VEHICLE POWER AND DRIVE MECHANISM
Filed June 5, 1934   6 Sheets-Sheet 1

Inventor
William B. Fageol
By Strauch & Hoffman
Attorneys

Patented June 8, 1937

2,083,059

UNITED STATES PATENT OFFICE 2,083,059

MOTOR VEHICLE AND VEHICLE POWER AND DRIVE MECHANISM

William B. Fageol, Kent, Ohio, assignor to Twin Coach Company, Kent, Ohio, a corporation of Delaware Application June 5, 1934, Serial No. 729,115

6 Claims. (Cl. 180—54)

The present invention relates to motor vehicles, particularly of the type used in the transportation of passengers in relatively large numbers. More particularly the invention relates to a vehicle of novel construction having a low floor and a low center of gravity in which the interior of the vehicle body is utilized to furnish accommodations for the maximum number of seated passengers with provision on the vehicle for the storage of baggage.

The invention also relates to motor vehicles having a motor such as an internal combustion engine disposed at the rear of the vehicle and interconnected with the vehicle drive wheels in a novel manner.

In prior types of vehicles, the available space within the vehicle has not been utilized for comfortably carrying the maximum number of seated passengers. This deficiency in prior seating arrangements is caused by the necessity for specially arranging the seats adjacent the engine and relatively large wheel housings forcing some of the passengers to ride on longitudinally placed or rearwardly facing seats.

As generally heretofore constructed, motor vehicles of the type previously mentioned include an internal combustion engine supported on the frame of the vehicle and disposed forwardly of the rear vehicle axle. With this arrangement, the engine encroaches on space which otherwise could be utilized to accommodate passengers and baggage, and the portion of the drive mechanism interconnecting the engine and the relatively remote drive wheels must be carried beneath the vehicle floor. As a result, these vehicles constructed according to practices widely followed prior to this invention, are still further restricted in providing space and headroom for passengers because of the necessity for elevating the floor to clear the portion of the drive mechanism which extends from the engine to the rear wheels.

Accordingly the primary object of the present invention is to provide a vehicle having a very low center of gravity and a relatively low floor affording easy access to the interior of the vehicle and providing comfortable accommodations for the maximum number of seated passengers and space for their baggage.

A further object of the present invention is to provide in a low floor vehicle a novel vehicle body constructed preferably of streamlined configuration which affords space at either end available for the vehicle driving motor or for the storage of baggage in transit.

Another object of the present invention is to provide a novel vehicle power and drive mechanism in which the vehicle power plant is located adjacent and to the rear of the vehicle drive axle.

Still another object of the present invention is to provide a novel power and drive mechanism for a vehicle, embodying a change speed transmission positioned transversely of the vehicle, and a longitudinal drive shaft extending from the transmission to the vehicle drive axle.

A still further object of the present invention is to provide a novel change speed transmission having a power take-off shaft at right angles to the shaft of the transmission which is adapted to be driven by the vehicle drive motor.

Still another object of the present invention is to provide a novel change speed transmission having a main shaft driven from the vehicle drive motor through a clutch and a counter shaft driven from the main shaft through gears comprising a change speed and reverse mechanism, the latter shaft driving a power take-off shaft for the vehicle wheels through bevel gears.

Still another object of the present invention is to provide a novel form of drive for a fan and other accessories to the vehicle power plant by means of a vehicle motor driven shaft extending beyond the enclosing casing for the change speed transmission mechanism.

A still further object of the present invention is to provide a novel power plant and drive mechanism for a vehicle wherein an auxiliary flywheel for the power plant encloses a friction clutch and is located at the end of the transmission remote from the motor.

Still another object of the present invention is to provide a motor driven vehicle comprising a novel form of body for supporting and housing the vehicle power plant and associated drive mechanism at the rear thereof without encroaching on the available passenger space within the vehicle.

A still further object of the present invention is to provide a novel power and drive mechanism for a vehicle in which the engine comprising the vehicle power plant is inclined from the vertical whereby to permit its installation transversely in a vehicle at the rear thereof without projecting upwardly into the vehicle passenger carrying space.

A still further object of the present invention is to provide a novel dust-tight engine compartment in a vehicle in combination with novel means for introducing cooling air into the engine compartment in a manner to exclude dust and road dirt from the engine.

A still further object of the present invention is to provide an air duct between the walls of a vehicle body for supplying air to cool the engine, the said duct extending upwardly to the roof of the vehicle and ending in a projection or scoop to cause a flow of cool air into the duct upon motion of the vehicle.

A further and related object of the present invention is to provide a novel window arrangement in the interior and exterior walls of a vehicle which enclose an air duct.

Still another object of the present invention is to provide a novel combined engine cooling and vehicle ventilating arrangement for passenger vehicles wherein air is exhausted from the interior of the vehicle by the flow of engine cooling air included in a duct or conduit supplying cooling air to the power plant and radiator.

A still further object of the present invention is to provide a novel vehicle body construction in which the vehicle glass is installed in a manner to impart strength and rigidity to the body structure.

Further objects of the invention will appear from the following description and appended claims when taken in connection with the accompanying drawings wherein:

Like reference characters indicate like parts throughout the several figures.

Referring to the accompanying drawings, and particularly to Figures 1 to 4 thereof, numeral 15 indicates a vehicle constructed in accordance with the present invention and includes a passenger carrying body of substantially the same height from end to end and of substantially the same width at any point along the length thereof. The body of the vehicle 15 is preferably constructed by fabricating a base frame 16, illustrated in detail by Figures 5 and 6, to which the body sides and ends are rigidly connected.

The sides 17, ends 18 and roof 19 of the body are constructed and assembled with the base frame 16 and are rigidly attached to each other and to the base frame to reinforce it and give it sufficient strength and rigidity so that it may serve as a support for the power plant and as the means of attachment of the running gear although the portion of the body which carries the power plant extends a substantial distance behind the rear axle. The body ends preferably slope toward the center of the vehicle and are rounded in a graceful curve which blends into the body sides at each end of the vehicle to give the body a streamlined appearance. The roof is also curved to blend into the tops of the sides and ends of the body further enhancing the graceful appearance of the vehicle.

The power plant and all of its accessories are supported upon the base frame of the body, and the axles that resiliently support the body are connected to structural members forming a part of the base frame by means of springs. The base frame 16 as was stated above is especially suited to support the power plant at the rear end thereof and includes a pair of spaced longitudinal members 20 and 21 (Figure 5) extending from end to end of the base frame and secured in spaced parallel relation by a series of transverse members that extend the full width of the vehicle. Two of these transverse members 22 and 23 are located adjacent the rear wheels and similar members 24 and 25 are located adjacent the front wheels. Other transverse members 26 of the series are spaced at intervals along the central part of the vehicle between members 23 and 24. The transverse members 22 to 26 are preferably of Z shape in cross section and support the vehicle body floor 27 on their horizontal top flanges. The lower horizontal flanges are connected directly to the longitudinal frame members 20 and 21.

Further longitudinal members 28 and 29, disposed in the planes of the sides of the body, form a part of the base frame of the body and are preferably continued to form end frame members that are arranged substantially in the planes of the ends of the vehicle. These frame members are designated by numerals 30 and 31. If desired, the frame members 30 and 31 may be separately formed members rigidly attached in any manner to the longitudinal members 28 and 29 or these latter members may be continued at each end to form half of each of the members 30 and 31.

The longitudinal members 28 and 29 are suspended in planes beneath the transverse members 22 to 26 and are connected to brackets of any desired form carried by the latter members. These brackets may be in the form of plates 32 secured to the transverse frame members along their top edges with their outer edges secured to one leg of the upstanding frame members or side posts 33 for the body sides which rise from the frame members 28 and 29.

The frame members 28 and 29 are bent upwardly as shown at 34 and 36 (Figure 6) to clear the road wheels 37 and 38. The transverse frame members 22 and 23 are connected by plates 32 to the upstanding sides of the curved portions 34 at each side of the vehicle and the frame members 24 and 25 are similarly connected to the curved portions 36. A transverse member 39 lies beneath the members 20 and 21 and interconnects the outer longitudinal frame members 28 and 29 to the rear of the curved portions 34 thereof.

The base frame 16 together with the body constructed thereon is supported on a pair of axles 41 and 42, said axles being preferably spaced substantially the same distance from the respective ends of the body so that the overhang of the body to the front and rear of the axles is substantially the same. The axle 41 is attached to the base frame of the body resiliently by means of springs 43 of usual form. These springs are attached to the longitudinal members 20 and 21 by pivot pins and suitable shackles as is well known in the art. The axle 42 is resiliently attached to the base frame by means of springs 44 of any approved form, said springs being preferably secured in known manner to the longitudinal members 20 and 21. Auxiliary transverse frame members 46 interconnect the members 20 and 21 adjacent the points of connection of the springs 43 and 44. The frame members 20 and 21 are curved upwardly over the axles 41 and 42 to permit relative movement between the base frame and the axles as the springs 43 and 44 flex in absorbing road shocks. The curved portions of these members over the axle are relatively close to the wheels 37 and extend slightly above the floor 27 of the vehicle.

The base frame 16 is utilized to support a fuel tank 47 (Figure 5) located beneath the floor line 27 and carried from the forward pair of transverse frame members 26. The vehicle battery 48 is supported on transverse members 49 and 51 extending between the longitudinal base frame members 20 and 28. Battery 48 may be made conveniently accessible for inspection by mounting it upon an auxiliary framework slidable on the members 49 and 51 so that the battery may be pulled out beyond the member 28 through an opening in the body side.

The vehicle road wheels 37 and 38 are equipped with brakes of conventional form that are actuated by a brake mechanism including fluid cylinders 53 forming a part of a fluid system for controlling the brakes of the vehicle. The wheel brakes are under control of an operator by conventional means such as a brake pedal (not shown) located adjacent the steering wheel 56.

The forward axle 41 is supported on the wheels 38 attached thereto so that the wheels are dirigible in accordance with well known practice, and a link 54 connects the wheels for simultaneous steering movements. A steering wheel and steering gear 56 controls the steering movements of the wheels 38 through the drag link 57. The axle 42 is supported by the drive wheels 37 which are preferably attached to live axle sections disposed within the axle housing and operatively connected to a differential of conventional form mounted within the differential housing 58.

To the end that the vehicle floor space will not be unduly encroached upon by the necessity for receiving the wheels 37 and 38 within the body, these wheels are of relatively small size and are equipped with pneumatic tires of suitable cross sectional area and girth. The low wheel centers of the relatively small wheels lowers the vehicle with respect to the roadway bringing the center of gravity of the vehicle lower and lowering the passenger steps 59 thus making it easier for passengers to board and alight from the vehicle. The wheel housings 60 and 61 (Figure 4) which extend into the body and house the wheels 37 and 38 respectively are relatively small and occupy a minimum of floor space and project upwardly into the body a relatively short distance thereby presenting no interference to the preferred seating arrangements to be described in detail.

The dual drive wheels 37 are driven from the vehicle power plant through the novel drive mechanism forming an important part of the present invention. The disposition of the power plant within the vehicle body and the details of the novel drive mechanism will now be described. The power plant and transmission mechanism, mounted transversely on the base frame 16 of the body to the rear of the differential drive axle 42 is preferably of unitary construction and comprises an internal combustion engine 63 and a change speed transmission mechanism of novel form housed in a casing 64. A friction clutch, indicated generally by reference character 66, is also housed within the casing 64 and is associated in a novel manner with the transmission mechanism and serves to disconnect the engine 63 from the transmission when desired.

Figure 8:
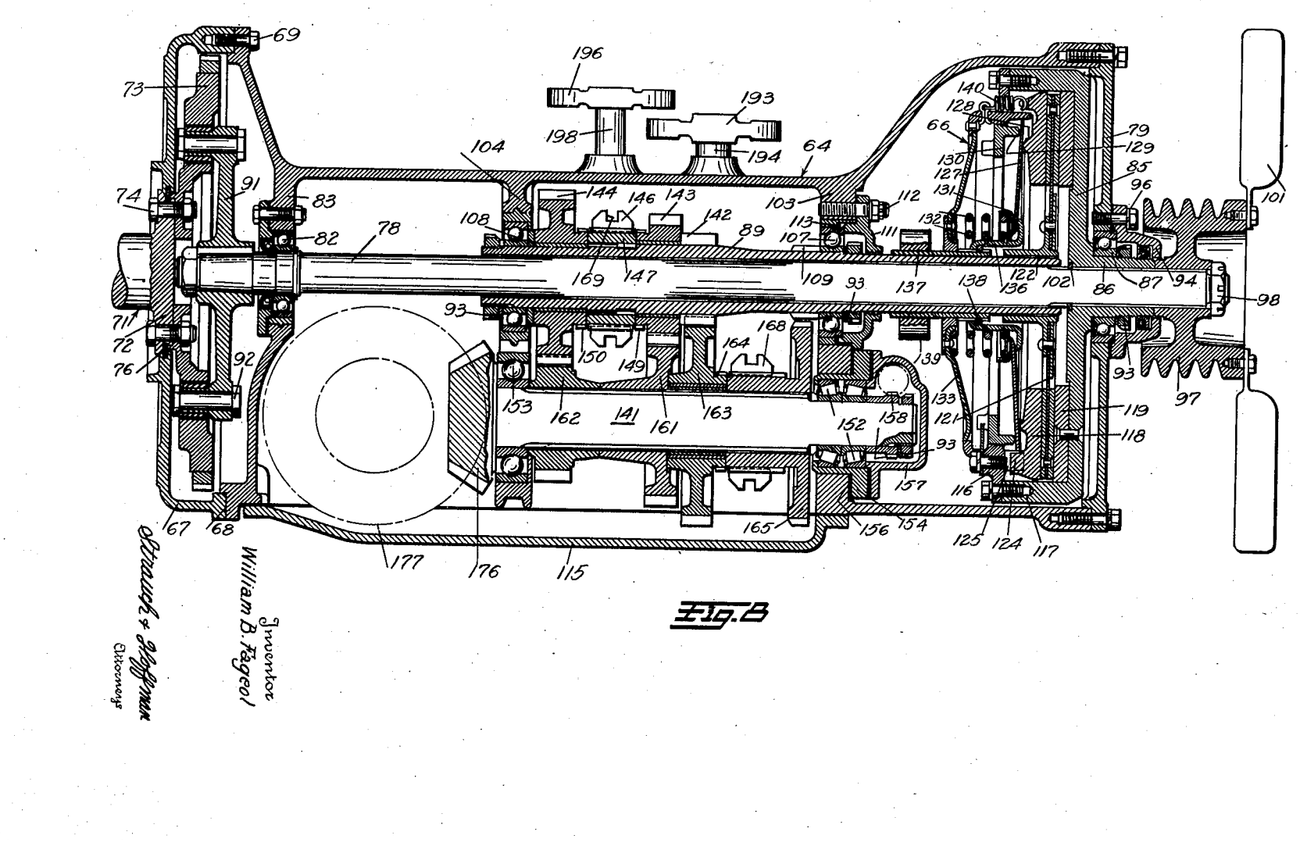
Figure 8 is sectional view in side elevation on a greatly enlarged scale of a preferred form of transmission mechanism.

Referring in detail to Figure 8 of the drawings, the housing 64 at the end adjacent the engine 63 is provided with a bell shaped cover plate 67 adapted to be secured in any suitable manner to an end of the engine housing. A shouldered recess 68 at the end of the housing 64 snugly receives the outside rim of the bell shaped flywheel housing 67 and bolts 69 or other suitable fastening devices are used for securing the housing 64 to the flywheel housing 67.

The engine crank shaft or an extension 71 thereof is provided at its end with a disk-like member 72 to which a flywheel 73 is secured by cap screws 74. A packing ring 76 cooperates with a beveled oil slinger at the end of the crankshaft 71 and seals the flywheel compartment in the cover plate 67 from the engine crankcase. The flywheel 73 is provided with an external ring gear adapted to be engaged by the pinion of an electric or any other suitable starting motor (not shown).

A shaft 78 extends through the housing 64 and one end of this shaft projects beyond the end cover plate 79 of the housing for a purpose to be described. The shaft 78 is rotatably supported adjacent one end by a bearing 82 preferably of the anti-friction type suitably carried in an aperture in the partition wall 83. The other end of the shaft 78, which projects through the cover plate 79, is splined for a portion of its length and receives a second flywheel 85 having an axially extending internally splined hub 86. A bearing 87 positioned within an aperture in the cover plate 79 rotatably supports the flywheel hub 86 and shaft 78 nested therein.

A hollow gear cluster shaft 89 surrounds the shaft 78 and is driven from the said shaft through the clutch 66 which is housed in the flywheel 85 in a manner to be described.

The shaft 78 is driven from the crank shaft 71 by a coupling member 91 which is keyed or otherwise suitably secured to the end of shaft 78. A nut on the threaded end of the shaft prevents accidental removal of the coupling member 91. The spider arms of the coupling member are connected by bolts 92 to the flat radial portion of the flywheel 73. The portions of the flywheel at the points of connection of the arms of the spider 91 are preferably provided with suitably mounted inserts so that the driving connections between the crank shaft 71 and the drive shaft 78 will be flexible in character.

The inner race of the bearing 87 is maintained in position on the hub 86 of flywheel 85 by means of a fitting 93, which is screwed over a threaded section of the hub. The outer race of the bearing 87 is held in position in the cover plate 79 by means of a cap 94, which is secured to the cover plate by screws 96 or other suitable fastening means. The packing member seated within the recess at the end of the cap 94 remote from the cover plate 79 bears against the hub 86 and effectively seals the joints between the relatively movable parts against escape of lubricant.

The projecting end of the shaft 78 is provided with an internally splined pulley 97 which abuts the hub 86 of the flywheel and is retained in position by the nut 98 on the reduced threaded end of the shaft 78. The pulley 97 is grooved so that it may be used to drive accessories such as a generator or compressor or other auxiliary apparatus. A fan 101 is provided on the end of the pulley and may be used to draw or force a current of air through a cooling radiator for the internal combustion engine in the well known manner, but it is especially suited to assist in drawing a current of air through the radiator in the novel manner to be described and forming a part of the present invention. The nut 98 also serves to maintain the flywheel in position longitudinally of the shaft 78 by holding it against the stop or split ring 102.

The flywheel 85 forms a part of the friction clutch 66 and is accommodated in a chamber formed at the end of the casing 64 at one side of the partition wall 103. A second partition wall 104 divides the casing longitudinally and the hollow gear cluster shaft 89 is carried by bearings 107 and 108 supported in the walls 103 and 104 respectively. The inner race of the bearing 107 is retained in position against the end of a pinion 109 formed on the shaft 89 by means of a clamping device 93 in the manner described in connection with the inner race of bearing 87. The outer race of the bearing 107 is retained in position in the wall 103 by means of a cap 111 secured in position by the bolts 112 or other suitable securing means. A ring 113 engaged in a groove in the bearing race is seated against a shoulder formed in the bearing recess. The inner race of the bearing 108 is positioned against the gear assembly, to be later described in connection with the description of the change speed mechanism, by means of a clamping member 93 threaded on the end of the shaft 89. A removable cover 115 gives ready access to the space within the housing 64 between the partition walls 83 and 103 and like the covers 67 and 79 is held in place by suitable bolts 69.

The clutch 66 which provides a driving connection between the shaft 78 and the hollow gear cluster shaft 89 may be of usual construction, but modified in certain respects in view of the novel arrangement of shafts 78 and 89. The flywheel 85 is chambered for reception of the operative parts of the clutch 66 and the open end of the chamber is closed by a cover plate 116 bolted to the axially extending flange 117 which encloses the chambered interior of the flywheel. An axially adjustable friction clutch member 118 co-acts with a friction member 119 on the flywheel to clamp between them the friction disk 121 through which the shaft 89 is rotated. This disk is riveted or otherwise secured to a splined collar 122 which is received upon the splined end of the shaft 89 to permit it to have a slight axial movement relative thereto. The disk 121 is faced on each surface with suitable friction material for cooperation with the friction members 118 and 119. The friction clutch member 118 is caused to revolve with the flywheel by lugs 124 formed at suitable intervals on said clutch member, and these lugs extend between inwardly projecting lugs 125 on the cover plate 116. The clutch member 118 is normally forced into contact with the friction disk 121 by means of a plurality of levers 127 which are fulcrumed on projections 128 and 129 formed upon member 118 and an adjustable portion 130 of cover plate 116. Pressure is applied to the inner ends of the levers by an axially movable collar 131 and springs 132, the latter being interposed between a member 133 which is secured to the cover plate, and the collar 131. A radially flanged sleeve 136 is secured to an axially reciprocable collar 137 journalled over the shaft 89 and levers 127 are pressed against the radial flange of the sleeve 136 by the springs 132.

The sleeve 136 is restrained against axial movement to the right on collar 137 by a ring 138. Axial movement of the collar 137 to the left carries the flanged sleeve 136 with it and releases the pressure of the levers against the clutch member 118. A suitable release collar 139 is revolvably supported at the end of the collar 137 for connection to a lever or other suitable clutch operating means. In order that the clutch member 118 may separate from the friction disk 121 when the pressure on the levers is released, a series of springs 140 is provided which are secured to the cover plate 116 and the clutch member 118 and these springs exert tension on the clutch member to withdraw it when the pressure on the levers 127 is released.

The operation of friction clutch just described is believed to be obvious and no separate description thereof is necessary. It will be noted, however, that the clutch disk 121 and the release mechanism and its associated parts are carried upon the hollow gear cluster shaft 89, and that the latter and the shaft 78 are concentric and extend from the clutch 66 toward the engine and transmission mechanism.

The counter shaft 141 of the transmission mechanism is driven from the hollow shaft 89 through a series of gears and clutching devices. Previously mentioned pinion 109 and a pinion 142 are formed on or secured to the shaft 89. Gears 143 and 144 are journalled for rotation upon the shaft 89 and are adapted to be clutched to the shaft by an internally splined dog clutch member 146 which is slidable on the splined sleeve 147, the latter being keyed on or otherwise secured for rotation with the shaft 89. The previously mentioned bearing adjustment member 93 serves to axially position the gears 143 and 144 and the sleeve 147 on the shaft 89. The hub of each gear 143 and 144 is provided with clutch teeth 149 and 150 whereby either of these gears may be secured to the shaft 89 by moving the dog clutch member 146 axially on the sleeve 147.

The shaft 141 is journaled in partition walls 103 and 104 by bearings 152 and 153. The bearing 152 is a combined radial and thrust bearing carried in a cage or housing 154. This housing is adjustable axially of the aperture in the partition wall 103 by removing or replacing shims 156. A cap member 157 covers the bearing cage or housing 154 and carries a speedometer drive pinion which is meshed with a speedometer drive gear 158. A threaded member 93 retains the gear 158 in position.

Gears 161 and 162 are splined or otherwise keyed to the shaft 141 and are constantly in mesh with the gears 143 and 144 on the shaft 89. A third gear 163 is rotatably journaled on the shaft 141 and is provided with clutch teeth 164 on an axial extension of its hub. A fourth gear 165 is keyed or otherwise secured for rotation with the shaft 141 and is provided with an axially extending splined hub upon which the internally splined dog clutch member 168 is slidably mounted. It will be noted that the teeth of pinion 109 and gear 165 are chamfered so that a slidable idler pinion (not shown) may be engaged with the gear and pinion when it is desired to reverse the direction of rotation of shaft 141.

High speed drive of the shaft 141 is obtained by moving the dog clutch member 146 to the left by means of a suitable shifter fork engaged in the groove 169 so that the clutch teeth 150 are engaged by the internal splines of the dog clutch member. The sleeve 147 and the gear 144 rotate together driving the gear 162 which is secured to shaft 141. It will be understood that when the dog clutch member 146 is moved to the left, the dog clutch member 168 is in the position shown and the gears 109 and 165 are not interconnected by the shiftable idler pinion.

The shaft 142 is selectively driven at a lower speed by sliding the dog clutch member 146 to the right so that the gear 143 is clutched for rotation with the sleeve 147. Gear 143 drives shaft 141 through its meshing engagement with the gear 161.

A still lower relative speed of rotation of the shaft 141 is secured by moving the dog clutch member 168 to the left into engagement with the teeth 164 formed on the hub of gear 163. The shaft 141 rotates with the gear 165 which is clutched to gear 163, this latter gear being driven by the pinion 142, with which it is constantly in mesh.

When the shiftable idler gear is meshed with pinion 109 and gear 165 for reversing the direction of rotation of shaft 141 it will be understood that dog clutch member 146 is in the position illustrated on the drawings. The dog clutch member 168 which is preferably interconnected with the shifter mechanism for the shiftable idler pinion will assume a position to the right of that shown in the drawings. By interconnecting the shifting mechanism for the dog clutch member 168 and the shiftable idler pinion possible damage to the transmission is prevented which would result if the idler pinion and the clutch member 168 were independently movable.

A power take off shaft 175 (Figure 5) rotatably mounted on the casing 64 in suitable bearings, extends from the side of the casing and is driven from the shaft 141 by a bevel pinion 176 and the bevel gear 177. A drive shaft 178 extends forwardly from the power take-off shaft 175 to the drive axle 42 and is provided with universal joints 179 of any approved design and the necessary slip joints permitting extension of the drive shaft as the axle 42 follows irregularities in the roadway. The relatively small drive wheels 37, previously described, make possible the use of a relatively light drive axle 42 for transmitting the power of the engine to the rear drive wheels 37. The preferred location of power take-off shaft has been described, however, where it is desirable or where the vehicle on which the transmission of the present invention is installed makes it necessary to alter the location of the take-off shaft 175, the counter shaft 141 may be positioned above shaft 78. This alternative location of shaft 141 will raise the shaft 175 and allow the shaft 178 to be inclined. This arrangement of the parts is suggested by Figure 5 of the drawings.

The change speed transmission mechanism is under control of the lever 181 (Figure 6) located adjacent the steering wheel 56 for convenient manipulation by the vehicle operator. Two pairs of cables 182 and 183 extend from the box 184 into which the lever 181 projects to the transmission casing 64. These cables are disposed beneath the floor 27 of the vehicle and preferably pass through the vertical webs of the transverse frame members of the base frame 16. Cable sheaths 187 are provided for the ends of the cables 182 and 183 and are secured adjacent one end thereof to the floor 27 by a cleat 189 and by a similar cleat 191 to the vehicle body frame. Each cable of the pair 183 is connected to an end of a lever 193 which is secured to an upright shaft 194 (Figure 8) connected to the shifter mechanism for one of the sliding clutch members 146 or 168. Each cable of the pair 182 is likewise connected to an end of the lever 196. The lever 196 is secured on a shaft 198 connected to the shifting mechanism for the sliding idler gear and the clutch member 168. By this arrangement a pull on one of the cables of a pair will oscillate the associated lever from one extreme position in its range of movement to the other extreme position. The lever is returned by a pull on the other cable of the pair to any desired intermediate position or to its extreme position in the other direction. The shafts 194 and 198 are thus positively turned in the desired direction to effect movements of the shiftable elements of the transmission mechanism. The remote control for the change speed transmission mechanism so provided is positive in operation and precludes the possibility of partial movement of change speed elements of the transmission.

The operating shaft 199 of the clutch device is actuated by the fluid cylinder 201, the admission of fluid to this cylinder being under control of the operator by a suitable valve.

Figure 6:
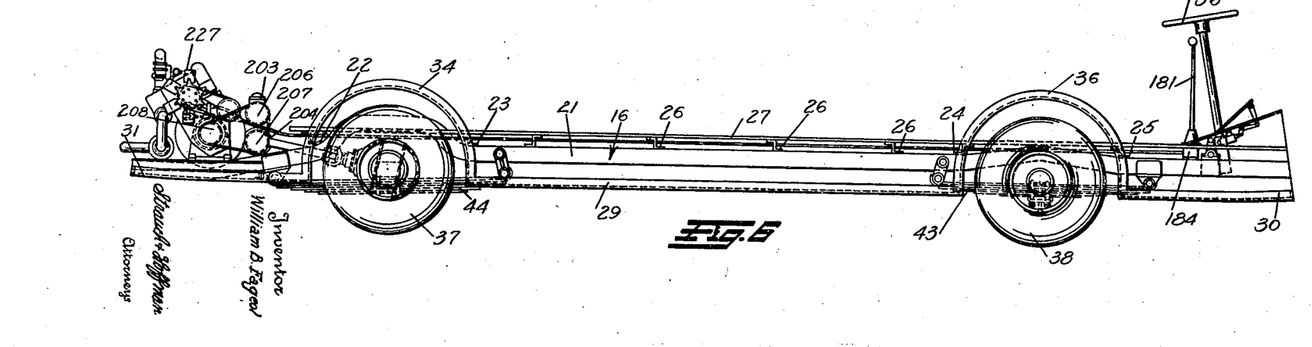
Figure 6 is a view in side elevation of the frame construction and the power plant and drive mechanism illustrated by Figure 5.

The engine is inclined from the vertical, as shown by Figure 6, to reduce its overall height, but is otherwise of substantially conventional design except for a slight modification in the crank case thereof to furnish suitable points of connection to the vehicle frame.

In order to conserve space within the body of the vehicle adjacent the engine it is important that the dimensions of the engine and the necessary accessories be kept at a minimum. These accessories include a fluid compressor 203 provided to supply fluid to the braking system of the vehicle and other fluid operated appliances such as the door operating mechanism and a generator 204 for charging the battery 48. The compressor and generator are mounted on a support extending from the side of the engine 63 and are provided with drive pulleys 206 and 207 respectively, which are driven by a belt from a pulley 208 on the engine crank shaft 71. The arrangement just described provides a convenient manner of mounting the generator and compressor in position to be driven by the crank shaft of the engine and when so mounted they are in position to be disposed beneath a passenger seat of the vehicle. It will be understood that the compressor and generator may be located at the end of the casing 84 so as to be driven from the pulley 97.

The unitary power plant and transmission mechanism previously described is housed within a dust tight compartment 210 (Figure 1) provided at the rear of the vehicle body and is mounted on the frame members 20 and 21 and an auxiliary supporting member 211 extending between the transverse frame member 39 and the end frame member 31. The compartment 210 is enclosed between the sloping rear end wall 18 which extends downwardly to the end member 31 of the base frame within an outer apron 212 and an inner wall 214 having a horizontally extending portion 216 which serves as a support for a passenger seat or series of seats 218. A partition 219 and a floor 220 over the base frame members completes the compartment 210 and seals it against road dust and dirt.

The cooling radiator 222 for the engine 63 is mounted above the engine between the walls 18 and 214 which form a duct or passage 223 for supplying cooling air to the radiator. The vehicle wall 18 bulges outwardly between the sides of the duct 223 adjacent the top of the vehicle and extends slightly above the line of the roof 19 to form an air scoop 224 for inducing a flow of air into the duct 223 as the vehicle moves forward. As was previously stated the engine compartment 210 is dust tight, and the scoop 224 positioned at the top of the vehicle draws in air which is substantially free from dust and road dirt. If desired, a screen may be placed over the mouth of the opening into the duct adjacent the scoop 224 as a protection against malicious insertion of objects into the duct. Windows 225 on either side of the duct 223 provide for vision to the rear of the coach.

Figure 7:
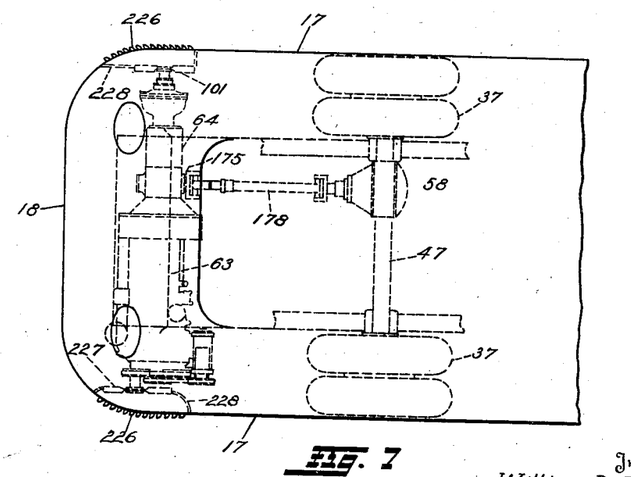
Figure 7 is a fragmentary top plan view to an enlarged scale of the rear portion of the vehicle of Figure 1 showing details of the novel cooling arrangement.

The air entering the duct 223 passes through the radiator and is exhausted through louvres 226 at the rear end of the vehicle. If desired a fan 227 of conventional form in addition to fan 101 may be provided on the engine 63 to reinforce the material draft produced by the scoop 224 and assists in forcing the air out of the compartment 210 through the louvres 226. A shroud 228 (Figure 7) is secured to the body side 17 and covers the louvres 226. A similar shroud 228 is provided on the opposite side of the body. The fans 101 and 227 cover an opening in each of the shrouds 228 and blow air directly out of the louvres 226.

The cooling arrangement just described is used effectively to ventilate the passenger space of the vehicle by withdrawing air therefrom. For this purpose an opening 231 is provided in the wall 214 near the roof line of the vehicle and stale air from the interior of the vehicle is drawn into the duct 223 by the ejection action created by the air moving in said duct. A cover 232 for the opening 231 permits control of the degree of ventilation and provides a means for closing the opening 231 when desired. The positive ventilation provided by the novel means just described effectively exhausts vitiated air from the interior of the vehicle and accomplishes this without creating drafts at a level which would annoy or cause discomfort to the passengers. Admission of fresh air can be accomplished in any suitable manner and the air admitted can be warmed by an auxiliary radiator through which is circulated the cooling fluid for the motor.

Figure 10:
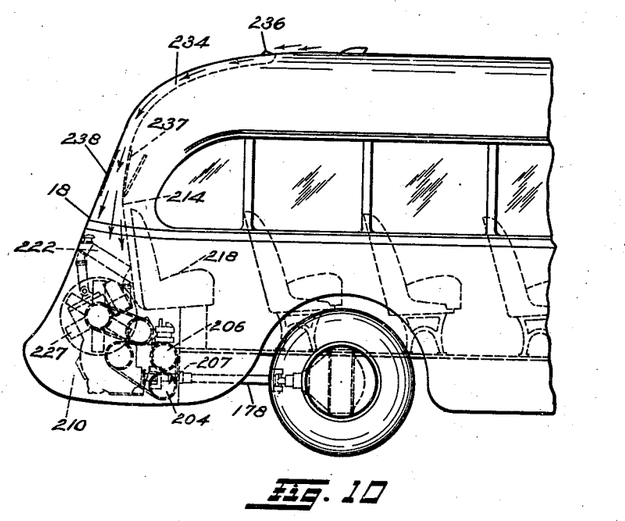
Figure 10 is a fragmental view in side elevation of the rear portion of a vehicle embodying the present invention in modified form.

Figure 10 of the drawings shows a slightly modified arrangement of the rear construction of the bus wherein a view to the rear is provided by means of a novel window arrangement. The drive mechanism illustrated by Figure 8 of the drawings is also modified in construction.

Referring to these figures, wherein like reference characters refer to corresponding parts in Figures 1 to 5, the rear wall 18 and the inner wall 214 are spaced apart to provide the duct or air passage 234 in communication with the dust-tight engine compartment 210. A scoop 236 is formed by the upwardly projecting outer wall which directs air into the duct in the manner previously described.

The inner wall is provided with a window 237 in line with a second window 238 in the outer wall 18. These windows provide a clear view to the rear of the vehicle and extend for a sufficient distance from either side of the center of the vehicle body so that an unobstructed view of the road and following traffic may be had.

The inner window 237 may be hinged to provide for ventilation of the interior of the body, and if this is done, movement of air in the duct 234 will function in the manner previously described to exhaust air through the opening provided when the window 237 is open. The window is preferably hinged along its bottom edge whereby opening of the window will not interfere with passengers on the rear seats and they will not be made uncomfortable by movement of air as it passes into the duct 234.

The power plant mounting and drive mechanism in the modification of Figure 10 is similar to that described in connection with Figures 1 and 2 of the drawings. The compressor 206 and generator 204 are mounted in a manner similar to that previously described, but are positioned at a lower level with respect to the engine casing. The radiator 222 is mounted above the engine 63 and the fan 227 and fan shroud 228, opposite the louvres 226 assist the scoop 236 in producing movement of air through the radiator by drawing air from the dust tight compartment and blowing it through the louvres.

The transmission mechanism within the housing 64 is of the type already described wherein the secondary shaft is disposed vertically beneath the engine driven shaft and the power take-off shaft 175 projects from the housing at a level with the drive axle.

The drive shaft 178 extending between the power take-off shaft 175 and the drive axle 42 is thereby disposed in a horizontal plane. This alternative arrangement of the parts comprising the final drive from the engine to the vehicle drive axle accommodates the novel power and drive system of the present invention to vehicles wherein the drive shaft must be located beneath the vehicle chassis frame.

The passenger carrying body which is provided by the construction so far described provides ample space for passenger seats which are accessible from convenient door openings in the body side. The low floor, which is well below the tops of the vehicle wheels, is brought close to the ground by use of the relatively small wheels and tires previously described. The door openings 241 and 242 on one side of the body open into step wells 243 which are below the centers of the road wheels. An easy step is afforded from the level of the roadway to the treads 244 of the wells 243. The floor 27 of the vehicle is within another easy step of each tread 244.

Figures 4, 9, 13, 14:
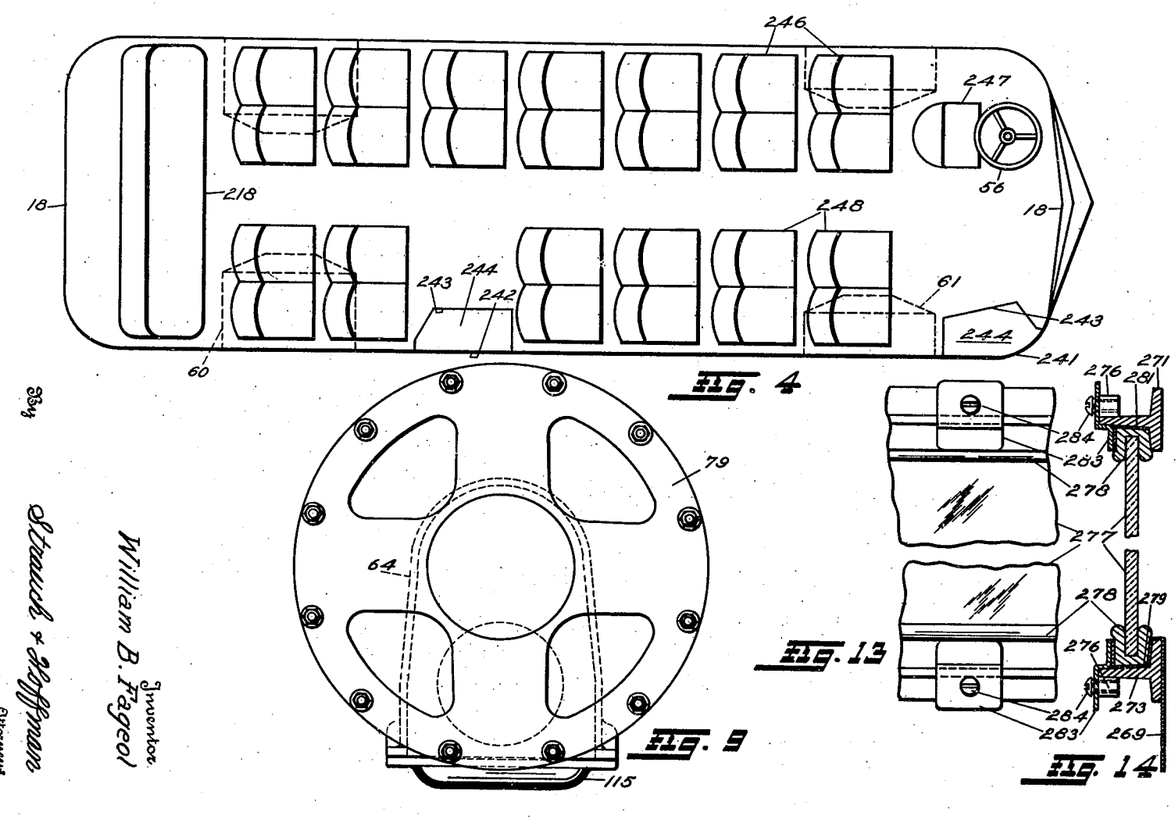
Figure 4 is a top plan view in section taken beneath the roof and showing the arrangement of seats and door openings.
Figure 9 is an end view of the transmission of Figure 8.
Figures 13 and 14 are detailed fragmental views of the method of mounting the stationary vehicle glass.

The seats within the vehicle body are preferably arranged as illustrated in Figure 4 of the drawings. A row of double seats 246 is disposed along one side of the vehicle in back of seat 247 which is provided adjacent the front wall 18 for the vehicle operator. A second row of double seats 248 is disposed along the other side of the vehicle. The small wheel housings 60 and 61 over the relatively small vehicle wheels do not restrict the leg room of the passengers occupying the two seats in each row which are disposed over the housings.

A wide passageway extends from front to rear of the vehicle body between the rows of double seats and provides easy access to any of the seats including rear seats 218 previously mentioned as being positioned over the engine compartment. The passageway extends forward to communicate with the wide space which is provided between the door opening 241 and the driver's seat 247 and the vehicle controls. The part of this wide space not devoted to an aisle way for the passengers and fare collecting operations is suitable for accommodating the passenger's luggage.

One of the seats 248 is omitted adjacent the door opening 242 to allow passengers to enter and leave the vehicle by this door way. For certain types of service, the door opening 242 may be omitted whereby an extra double seat 248 may be located at this point.

The seating arrangement described provides seats for comfortably accommodating thirty-one passengers on forwardly facing seats where the vehicle is operated over routes which are best served by including the doorway 242 in the structure of the vehicle. If the service demands on the vehicle do not require use of the doorway 242 the vehicle will accommodate thirty-three passengers on forwardly facing seats.

Figure 1:
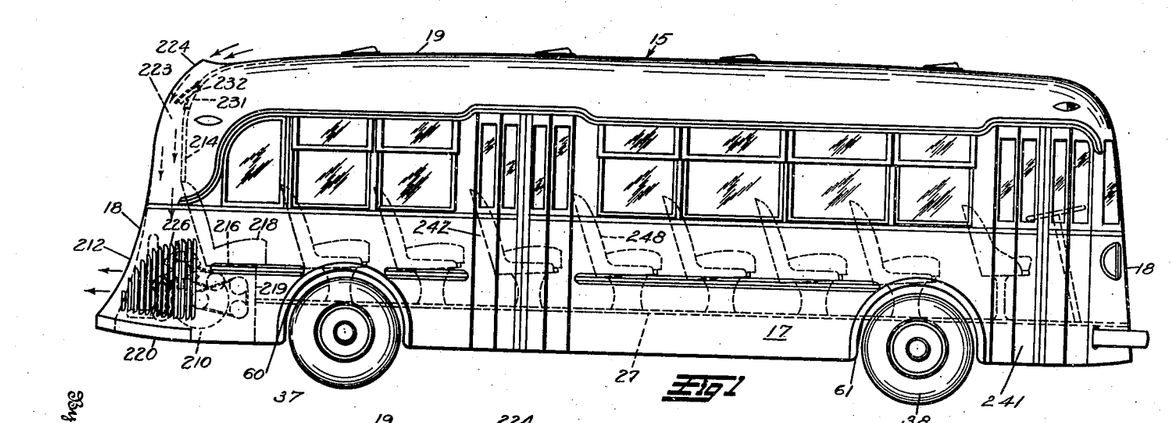
Figure 1 is a view in side elevation of a passenger vehicle embodying the present invention.
Figure 2:
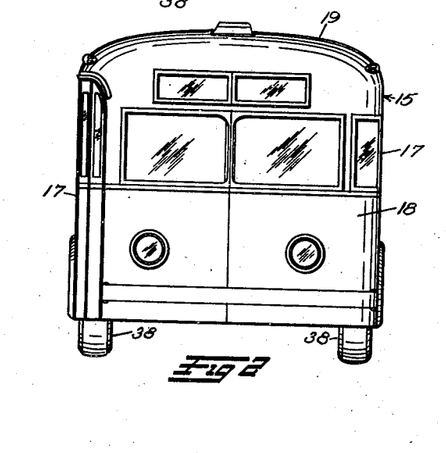
Figure 2 is a front elevational view of the vehicle construction illustrated in Figure 1.
Figure 3:
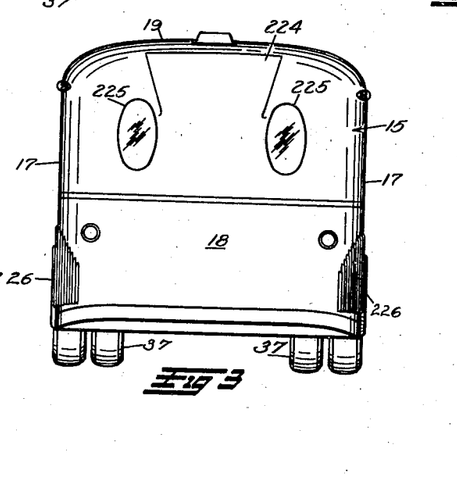
Figure 3 is a rear elevational view of the vehicle construction illustrated in Figure 1.
Figure 11:
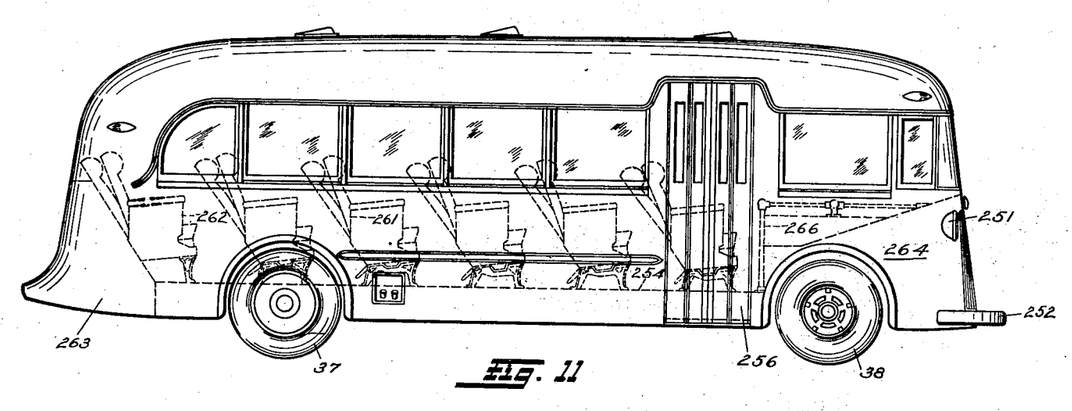
Figure 11 is a view in side elevation of a modified vehicle according to the present invention illustrating the location of a single entrance and exit door and baggage carrying space within the vehicle.
Figure 12:
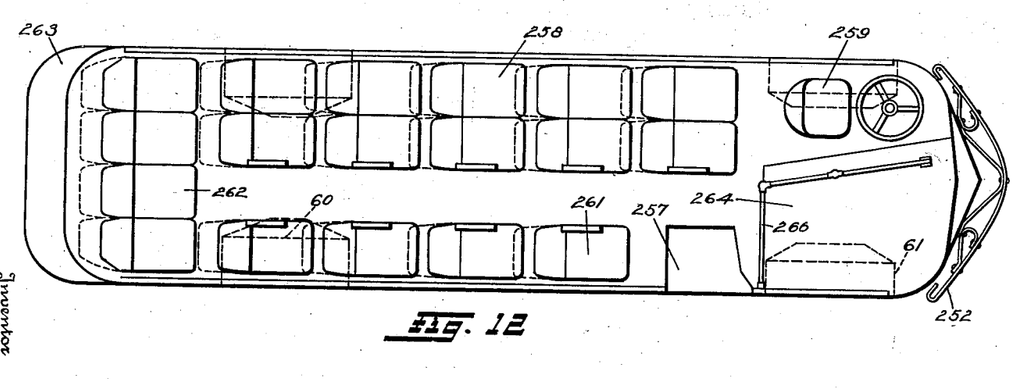
Figure 12 is a view similar to Figure 5 disclosing the seating arrangement and door location of the vehicle of Figure 11.

Figures 11 and 12 of the drawings illustrate a modified form of vehicle wherein the driving engine is located at the front of the vehicle and the space in the rear which is occupied by the engine in the vehicle of Figures 1 to 3 is used as a storage space for baggage. Referring to these figures, the vehicle body is constructed on a base frame of relatively light structural members as was described in connection with the vehicle of Figures 1 to 3. The vehicle body is equipped with fittings necessary to its operation, such as head lights 251 and a bumper 252. The body so constructed is mounted on axles supported by road wheels 37 and 38. The wheels are relatively small and the vehicle is suited to the use of such wheels so that the advantages outlined in the description of the vehicle of Figures 1 to 3 may be realized.

The floor 254 is well below the tops of the wheels and is close to the level of the roadway. An entrance door 256 in the side of the body just back of the front wheel 38 opens into a step well 257, the tread of which is positioned below the centers of the wheels and is within an easy step from the ground.

The seating arrangement illustrated by Figure 12 of the drawings provides forwardly facing seats for eighteen passengers. A row of double seats 258 along one side of the vehicle is arranged to the rear of the driver's seat 259, and a row of single seats 261 is located adjacent the other side of the vehicle. Seats 262 at the rear of the vehicle are provided for seating four passengers. Ample leg room is afforded passengers on the seats over the relatively small wheel housing 60. The passageway between seats 258 and 261 communicate with the step-well 257 so as to afford a convenient means whereby passengers may reach any of the seats in the vehicle.

A large baggage space 263 is provided at the rear of the vehicle suitable for storage of average size trunks and other baggage. The rear seats 262 are disposed over this baggage space resulting in economy of space within the vehicle.

Figure 5:
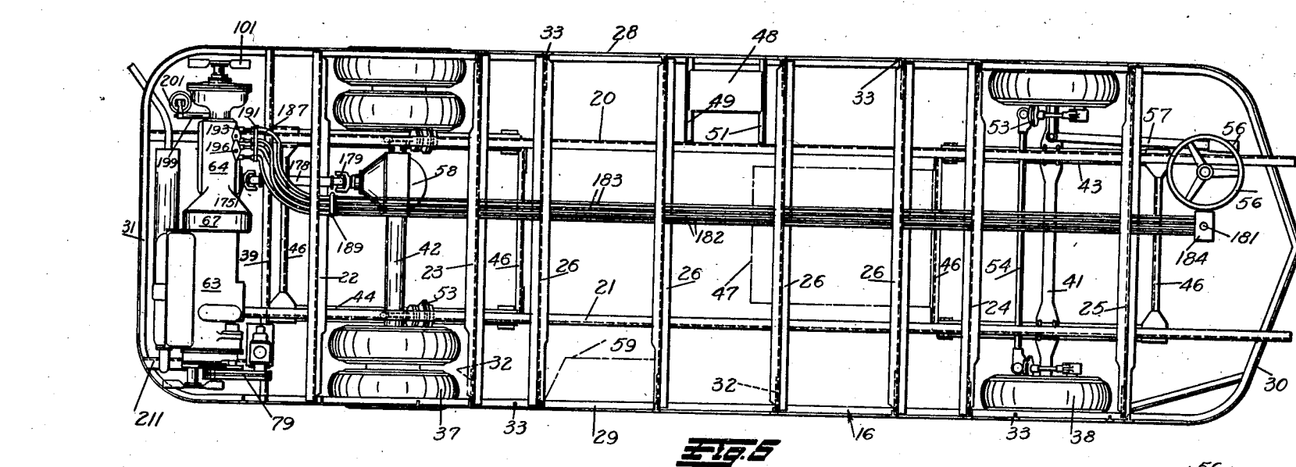
Figure 5 is a top plan view of the body frame construction, disclosing a preferred arrangement of rearwardly mounted power plant and drive mechanism.

The vehicle of Figure 11 is illustrated as being equipped with a forwardly mounted motor and to conserve space, the driver's seat 259 is located at one side of the housing 264 which covers the portion of the engine projecting into the vehicle body. This housing is preferably fitted with a rail 266 so that its entire top can be piled with baggage.

Where the novel power and drive system of Figures 5 and 6 is installed in the vehicle of Figures 11 and 12, the driving engine and its accessories will be accommodated in the baggage space 263 leaving the entire portion of floor forwardly of the step well 257 free. This space may be utilized by placing a seat similar to double seats 258 over the wheel housing 61 to face forwardly, or this entire space may be used for storage of baggage.

It will be observed that embodiment of the vehicle of the present invention illustrated by Figures 11 and 12 provides a maximum of space for passengers and their baggage, the latter being stored where it will not interfere with occupancy of the seats. This vehicle may be driven by a rearwardly mounted power plant of any description, but preferably by the novel drive arrangement disclosed herein as part of applicant's invention with such minor changes in details of the body framing as may be necessary. Such an alterative form of drive can be used without in any way affecting the novel seating arrangement of Figure 11 except that, as noted above, an additional forwardly facing seat suitable for two passengers may be added.

Figures 13 and 14 of the drawings illustrate a detail of construction whereby the rubber mounted stationary glass in the vehicle body serves as a structural member of the body and contributes its strength to the body structure. The individual load bearing members may therefore be made lighter for a vehicle of given size. Referring to the disclosure of Figures 13 and 14 which is applicable to any one of the stationary glass panels or windows of the vehicle of Figure 1 or Figure 11, reference character 269 represents a portion of the exterior vehicle wall or panel and the horizontal framing members of the vehicle body above and below the stationary window are indicated by reference characters 271 and 273. These members 271 and 273 are provided with tapped bosses 276 at appropriate places but preferably at the center of each window. The glass 277 is set in a relatively heavy rubber channel or gasket 278 which surrounds the four edges of the window. The metal of the wall 269 lies between the rubber channel 278 and the body structural member as indicated at 279 which provides a water tight seal at this point and adds the stiffening effect of the panel 269 to the framing of the vehicle. In lieu of an upper body panel similar to the panel 269, a lining 281 is provided between the gasket 278 and the framing member 271.

Angle shaped clips 283 are clamped by screws 284 against the channel 278 which firmly seats this channel against the glass and the outer flanges of structural members 271 and 273. Prior to the application of the channel 278 to the edges of the glass it is preferably coated with a suitable plastic cement such as "Dum-dum". The cement is also applied to the outer surfaces of the channel 278 where it is in contact with the body structural members.

By mounting the stationary vehicle glass in the manner just described, it adds strength to the body of the vehicle which is especially important in vehicles of the class described where a separate chassis is not used to support the vehicle body. The use of the glass to strengthen the body structure permits of making the framing structure lighter and also the body construction details shown by Figures 13 and 14 of the drawings adds the stiffening effect of the sheathing material for the body sides to the framing structure which results in a further reduction in weight of the framing members and a consequent lowering of the overall weight of vehicle.

It will be seen from the foregoing disclosure that a vehicle power and drive mechanism has been provided which occupies a minimum of space at the rear of the bus and enables full use to be made of the interior of the bus body for providing forwardly facing seats for passengers and accommodations for their baggage. It will further be seen that the streamlined configuration of the bus body provided by the present invention furnishes space which can be used for the storage of baggage if a forward location of the engine is selected or this space can be used for housing the driving engine so that it will be protected from dust and dirt. The housing of the engine in a dust-tight compartment of the vehicle is an important feature of the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A passenger carrying vehicle comprising a body, a power plant including an internal combustion engine, a dust tight housing for said engine within said body, a radiator for cooling said engine, means to convey air through said radiator to said housing, a wall of said body provided with an opening in communication with said air conveying means whereby air is withdrawn from the interior of said body.

2. In a passenger carrying vehicle, a body, a dust-tight compartment within said body, an internal combustion engine disposed in said compartment, a passage within the wall of said body opening from a point near the extreme top of said body for conveying dust free cooling air to said compartment, a radiator disposed across said passage, means affording an outlet from the compartment, a fan disposed to force air from said compartment through said outlet and driven by said engine, whereby air is drawn into said compartment through said radiator.

3. In a passenger vehicle, a body, a dust-tight compartment within said body, a combustion engine disposed in said compartment, a passage within the wall of said body for conveying cooling air to said compartment, a radiator mounted to permit the cooling air to pass therethrough, a fan disposed to force air from said compartment, whereby air drawn into said compartment is passed through said radiator, and a shroud provided between said fan and a wall portion of said body to prevent return circulation to said compartment of air discharged by said fan.

4. In a vehicle having a chassis, including wheels, a compartment at one end of the vehicle, said compartment being arranged transversely adjacent the level of the wheel tops and therefore near the ground; a combustion engine arranged transversely and disposed within said compartment to receive its fuel air supply from the interior of the latter; means for receiving air from the atmosphere at a level substantially above the compartment and for conveying it into the latter including a radiator for said engine; a fan at least at one end of said engine and driven thereby, and a lateral opening in the compartment adjacent said fan for cooperation therewith solely to discharge air from the compartment; said compartment being otherwise closed and therefore substantially dust-proof.

5. In a passenger carrying bus having rear driving wheels, a base frame extending rearwardly from said wheels at a level approximately the same as that of the wheel centers, a conventional seat behind the rear wheels with its cushion or pad disposed substantially at the level of the wheel tops, a transverse engine mounted on the rearward extension of the base frame in close proximity to the back and cushion of said seat and inclined relative to its own axis, a floor extending rearwardly at a level below that of the seat cushion and above that of the wheel centers, said floor terminating adjacent the front side of said engine, and a drive mechanism disposed between the floor level and the plane of said base frame and projecting from the engine forwardly to drive said wheels.

6. In a passenger vehicle, a body having a low floor level, a passenger compartment in said body, a rear seat in said compartment having its cushion or pad disposed substantially at the level of the wheel tops, an engine compartment adjacent the rear of said seat and having a forwardly upwardly inclined rear wall forming the rear end of the vehicle body, said engine compartment being partially under the seat cushion and partially to the rear thereof, said seat having a rearwardly inclined back, a transverse engine fitted into said compartment and likewise being inclined from the vertical, a wall extending upwardly from said inclined seat back to separate the upper portions of the passenger and engine compartments and to form with said rear wall of the engine compartment a duct for supplying cooling air to the engine.

WILLIAM B. FAGEOL.